United States Patent
Moon et al.

(10) Patent No.: US 7,133,536 B2
(45) Date of Patent: Nov. 7, 2006

(54) METHOD AND SYSTEM FOR WATERMARK DETECTION

(75) Inventors: Rodney Gene Moon, Charlotte, NC (US); Ravi Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 10/778,994

(22) Filed: Feb. 13, 2004

(65) Prior Publication Data

US 2006/0039580 A1  Feb. 23, 2006

Related U.S. Application Data

(63) Continuation of application No. 09/652,251, filed on Aug. 30, 2000, now abandoned.

(51) Int. Cl.
*G06K 9/00* (2006.01)
(52) U.S. Cl. ...................................... 382/100
(58) Field of Classification Search ................. 382/100
See application file for complete search history.

(56) References Cited

U.S. PATENT DOCUMENTS

| | | | |
|---|---|---|---|
| 5,710,834 A * | 1/1998 | Rhoads | 382/232 |
| 5,930,369 A * | 7/1999 | Cox et al. | 380/54 |
| 6,421,450 B1 * | 7/2002 | Nakano | 382/100 |
| 6,516,079 B1 * | 2/2003 | Rhoads et al. | 382/100 |

FOREIGN PATENT DOCUMENTS

| | | |
|---|---|---|
| JP | 53100895 | 9/1978 |
| JP | 54-084796 | 7/1979 |
| JP | 54-084797 | 7/1979 |
| JP | 60-042995 | 3/1985 |
| JP | 02-091791 | 3/1990 |
| JP | 08-180189 | 7/1996 |
| JP | 09330450 | 12/1997 |
| JP | 61143897 | 7/2001 |

OTHER PUBLICATIONS

Cox et al, "Secure Spread Spectrum Watermarking for Images, Audio and Video", in IEEE Int, Conference on Image Processing, vol. 3, pp. 243-246, 1996.*

* cited by examiner

*Primary Examiner*—Jingge Wu
*Assistant Examiner*—Tom Y. Lu
(74) *Attorney, Agent, or Firm*—Douglas A. Lashmit; Hoffman, Warnick & D'Alessandro LLC

(57) ABSTRACT

A system and method of detecting and authenticating a watermark on a document such as a check which is supposed to include a watermark having known characteristics to verify the authenticity of the document. A digitized image of the document is stored and processed through transformation which generates a frequency distribution. That frequency distribution is processed to determine one or more harmonic compared to a stored value associated with the document to determine that a watermark exists and it is the correct watermark.

15 Claims, 6 Drawing Sheets

METHOD AND SYSTEM FOR WATERMARK DETECTION

CROSS REFERENCE TO RELATED PATENTS

This is a continuation of prior patent application of Ser. No. 09/652,251 filed Aug. 30, 2000 now abandoned.

The present invention is related to the following documents, each of which is assigned to the owner of the present patent application and is specifically incorporated herein by reference:

U.S. Pat. No. 4,888,812 issued to Dinan et al. entitled "Document Image Processing System", a patent which is sometimes referred to in this document as the Check Image Patent.

Patent application Ser. No. 10/778,995 filed concurrently by Ravi Prakash and entitled "Method and System for Applying a Watermark", a document which is sometimes referred to in this document as the Watermark Patent.

BACKGROUND OF THE INVENTION

1. Field of the Invention

The present invention is an improved system and method for processing a watermark on a document. More particularly, the present invention includes a system for verifying that a watermark is present on an image of the document and that the watermark is the correct watermark for the document.

2. Background Art

Checks are prepared in large quantities and represent "cash" to many in society today. Those checks are distributed for a variety of purposes—payroll, paying bills, purchasing goods and services, paying debts and dividends and interest. The volume of checks has been growing each year despite the rise of substitutes for cash, such as debit and credit cards, automatic teller machines, electronic funds transfers, automatic deposit of payments, automatic debits for bills and recurring transfers, electronic bill payment systems and other similar methods of conveying cash from one account to another.

As the number of checks increase, there is an increasing desire to process those checks quickly and efficiently, with a minimum of manual handling and a maximum application of automated processing techniques. Most checks are processed through a banking system (which includes both governmental central banking systems and commercial bank-like institutions such as commercial banks, savings and loan organizations, credit unions and other bank-like or bank-servicing operations), where checks are processed in an automated fashion to extract the information, then forwarding document (or the information contained thereon) to other institutions as necessary for the collection of the check. Some check processing facilities receive in excess of one million items per day for processing. High speed check processing equipment (such as the IBM 3890 Document Processing System) have become common place for processing the checks in such facilities where large numbers of checks are received each business day. Many of the check processing systems include an image capture device such as the ImagePlus High Performance Transaction System which IBM introduced in recent years to capture an image of the front and back of the check while it is being read and processed in the document processing system, between the time that the check is removed from a hopper at one end of the machine until it reaches a selected pocket at the other end of the machine. Such a system is described in the Check Image Patent referenced above.

As the number of checks increases, each check receives less and less manual attention and processing, relying on the automated equipment to do more of the processing. A check may have the account number and amount fee encoded on the check before the check is received and it may be provided with a tape listing of the amounts so that very little (if any) manual processing happens for each check in the banking system.

The increasing amount of automation and the decrease in manual processing along with an increase in sophisticated equipment for imitating a check opens the possibility for fraudulent activity in preparing and presenting checks. A criminal could take a genuine check and duplicate it (using techniques such as a photocopier), creating multiple similar checks or check blanks for fraudulent use or use a digital scanner to create a similar looking but totally bogus duplicate or blank check and use the bogus check improperly. Further, software for the creation of authentic-looking checks on a low-cost personal computer printer is widely available, complete with the appropriate magnetic ink character recognition symbols, checks which at one time were only available from large check printing companies using high-cost equipment. These examples illustrate that the spread of technology into low cost and widely-available hardware and software has made the production of fraudulent checks available at a nominal cost to those who need only a small investment and little, if any, technical expertise.

Since it is quick, easy and inexpensive to create fraudulent checks, it is not surprising that the number of such checks is increasing and has reached substantial proportions. It is accordingly a limitation of the prior art systems for processing checks that a simple, yet effective, way of detecting possibly fraudulent checks is not a part of the check processing systems.

Accordingly, it would be desirable to have a system which automatically detects whether a check is authentic. Such a system should be rather easy to use and allow for different watermarks to be on checks from different accounts. Such a system should also be difficult to fool with a photocopied check or a check which is printed using software and a laser printer.

But checks are frequently "busy", both initially when printed (with logos and scenic backgrounds) and, as the checks are sent through the acceptance process, it may acquire additional information (identification of the receiving clerk, approvals, identification of the person presenting the check, account number, etc.) which may appear in various locations on each check in a random location. As the check goes through a collection process, additional information may be placed on the check either manually or through the use of automated equipment—such as endorsements, where the check was processed, an item number, a paid stamp and other useful information in handling the check if it returned unpaid. Accordingly, each check becomes unique in bearing a variable amount of information located in diverse locations on the two sides of the check.

Any information placed on the check as a result of its original creation may be overwritten through the additional information which is placed on the check during preparation or during its processing. Such overwriting of random information in random locations makes it difficult to locate information which may have been printed on the check in a certain place to detect fraud.

Various security measures are already in use in check processing. One of these is the use of microprinting of the signature line, which has the advantage that the printing becomes blurred when the microprinting is photocopied. The signature line printed using microprint technology creates a signature line which is discontinuous (having gaps smaller than the resolution of a photocopier or digital scanner) but which appears to the eye and to mechanical devices as a solid line. When a check with a microprint line is duplicated through a photocopied or a digital scanner, the line becomes solid, allowing differentiation of the original check (with a discontinuous microprint line) from the duplicated check (with a solid line).

Another technique for deterring the use of a photocopier to make a duplicate of a genuine check is the so-called "void pantograph", a recurring printed pattern which, when produces a distinctive pattern of "VOID" legends across the check when photocopied but which is not apparent on the original check.

Various systems have been proposed for authenticating documents and images. One such system involves visually detecting a watermark which appears on an image and comparing the watermark to the watermark which is supposed to appear on the document. If the watermark is appropriate, then the document is presumed to be authentic and if the watermark is not present or has an incorrect appearance, then the document is suspect and presumed to be improper, perhaps because the document was prepared from a different paper stock than was authorized or perhaps because the document was altered at some point. In any case, to avoid a fraudulent transaction, the document would require careful attention—e.g., handling by hand rather than through an automated processing.

Many checks are processed at high speed through automatic processing systems known as document processors such as the IBM 3890 Document Processor. Such machines remove a single check from a stack of checks at an input hopper, move it along a pathway inside the processor past a read head which determines the particulars of the check (including the account and the amount) and then sorts the check into an appropriate pocket based on the information contained on the check. During the processing, the check may have information added to the check (such as an item number and/or an endorsement) and an image of the check may be captured, either through microfilming the check or through an image capture system using a digital camera.

Prior art watermark detecting systems have other limitations and disadvantages which will be apparent to those skilled in the art in view of the following description of the present invention.

SUMMARY OF THE INVENTION

The present invention overcomes the disadvantages and limitations of the prior art systems for processing checks or other documents. The present invention includes a system and method for detecting a watermark on a document and optionally verifying the correctness of the watermark on the document.

The present invention has the advantage that different watermarks can be used by different customers and check paper which is genuine for one customer may be identified as inappropriate and rejected when used for checks prepared on a different customer's account.

A further advantage of the present invention is that the system and method of the present invention includes a system for detecting the presence of a watermark on a document and determining whether the watermark on the document is the correct watermark for the document.

The present invention also has the advantage that the detection of the watermark can occur even though the check may include a scenic background (even one in which a variety of backgrounds are provided for different checks).

The system and method of detecting a watermark have the further advantage that the watermark may be detected and authenticated even if the document includes additional information which is written or stamped on the document in random locations.

The present system has the advantage that the watermark may be detected and verified even if writing on the document is located over a part or all of the watermark.

The present invention avoids the use of human examination to determine whether the document includes a watermark and it avoids the need for distribution of a list of approved watermarks which may be associated with respective accounts and any human comparison of the watermark on a document with that list of approved watermarks.

The present invention is a system and method for detecting and authenticating a watermark on a document by imaging the document, determining a frequency distribution for the image of the document and analyzing that frequency distribution, comparing the determined frequency distribution to a value which indicates the appropriate frequency distribution for the document and determining whether to accept the document based on whether the frequency distribution determined matches the appropriate frequency distribution.

Other objects and advantages of the system and method of the present invention will be apparent to those skilled in the relevant art in view of the following description of the preferred embodiment, taken together with the accompanying drawings and the appended claims.

BRIEF DESCRIPTION OF THE DRAWINGS

Figure 1:
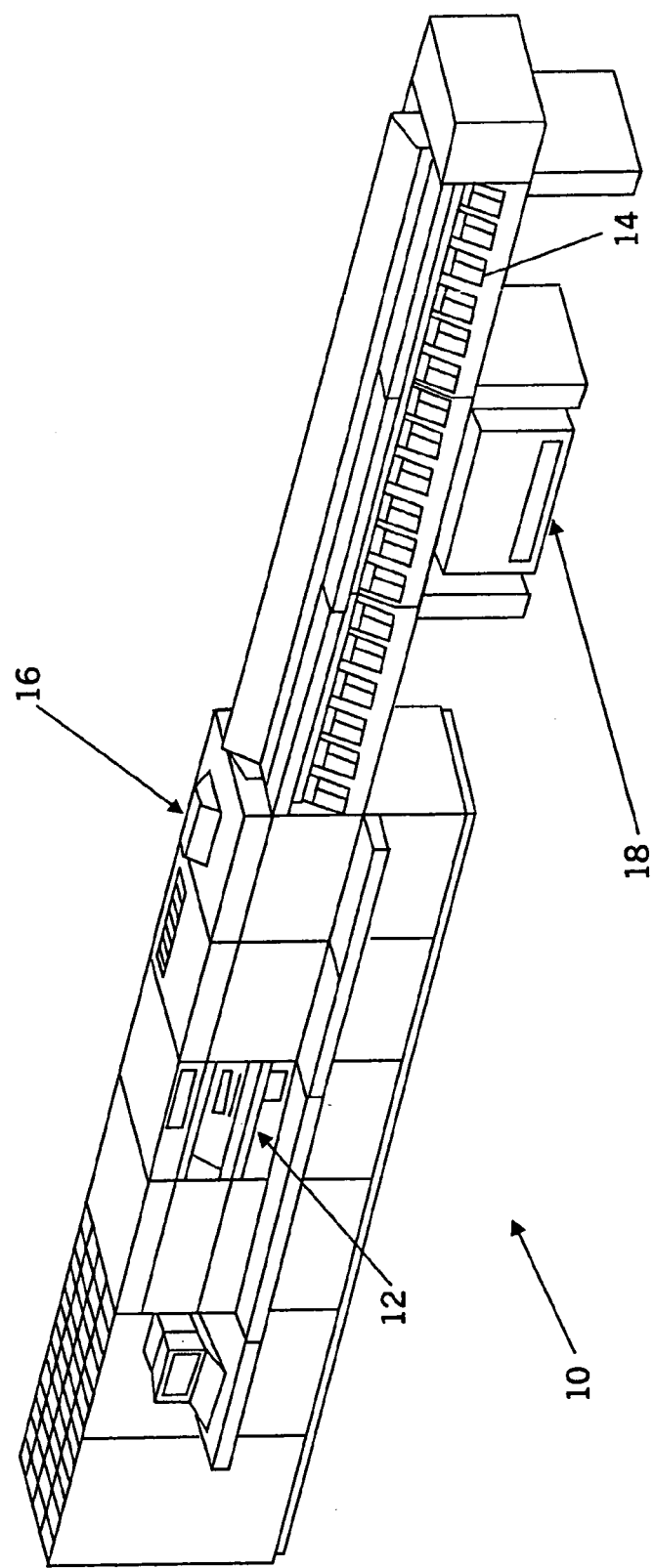
Figure 2:
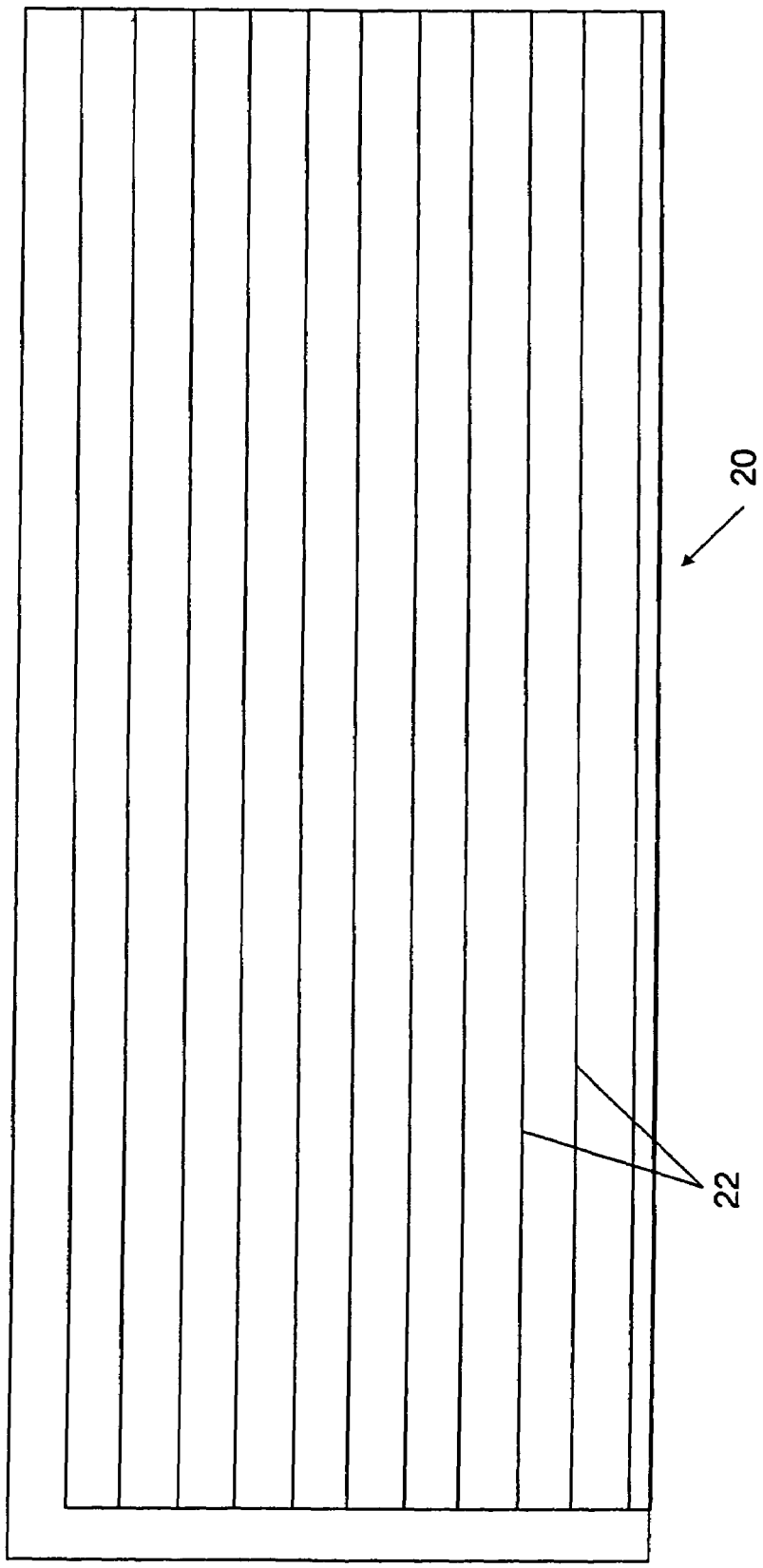

Having thus described some of the objects and advantages of the present invention, other objects and advantages will be apparent to those skilled in the art in view of the following description of the invention taken in conjunction with the accompanying drawings in which:

FIG. 1 is a perspective view of a document processing system useful in practicing the present invention;

FIG. 2 is a view of a document including a watermark.

Figure 3:
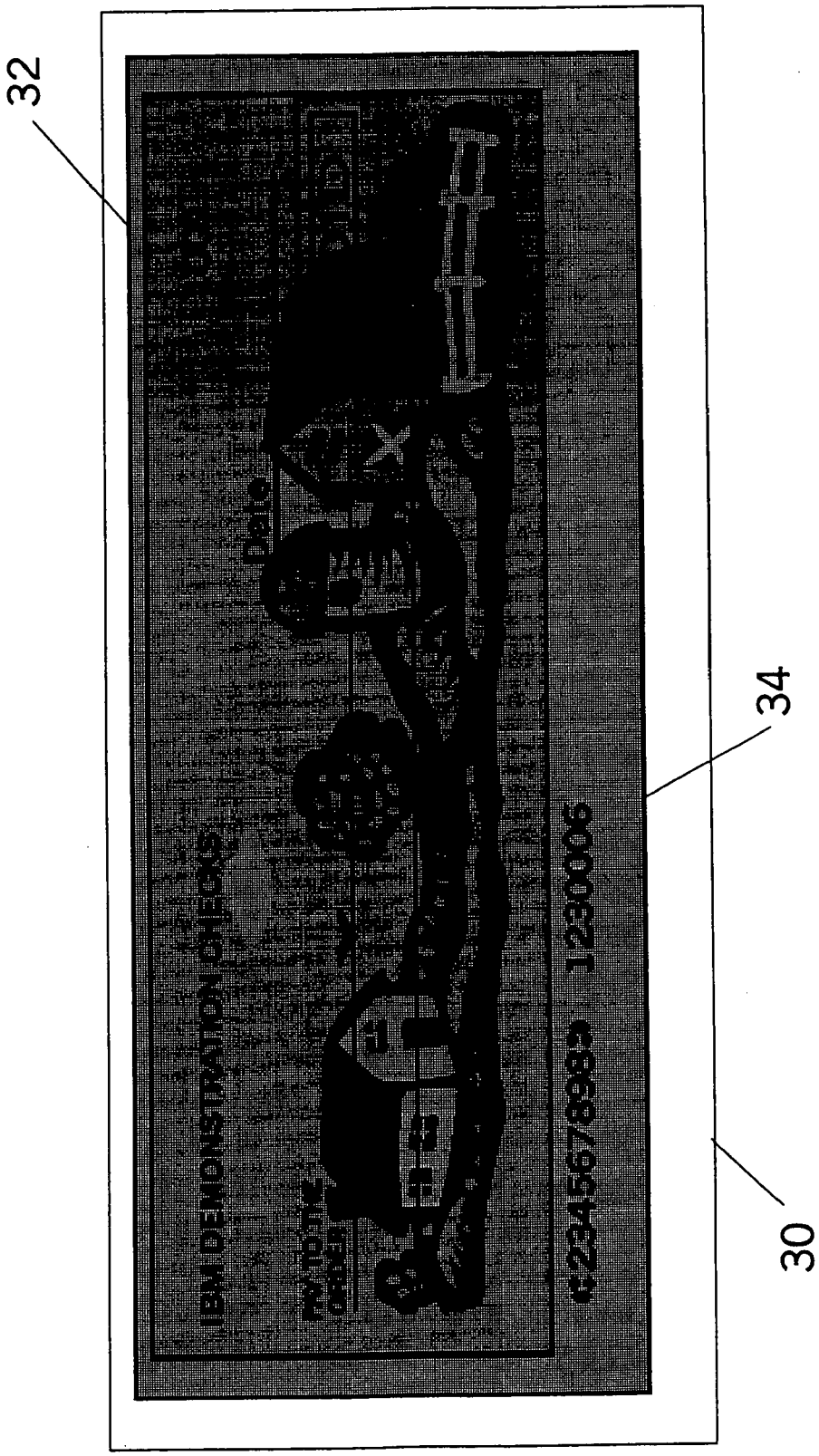
Figure 4:
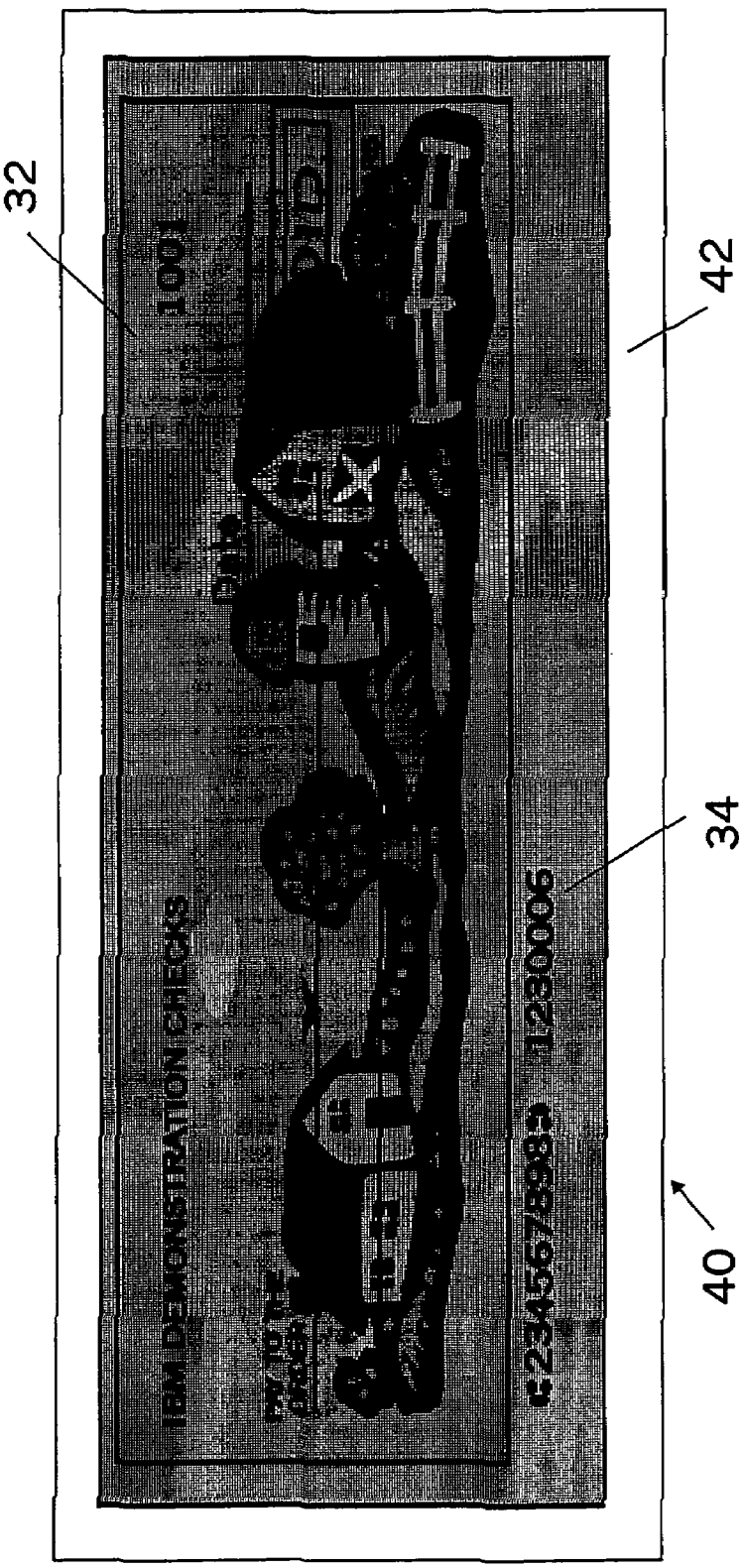
Figure 5:
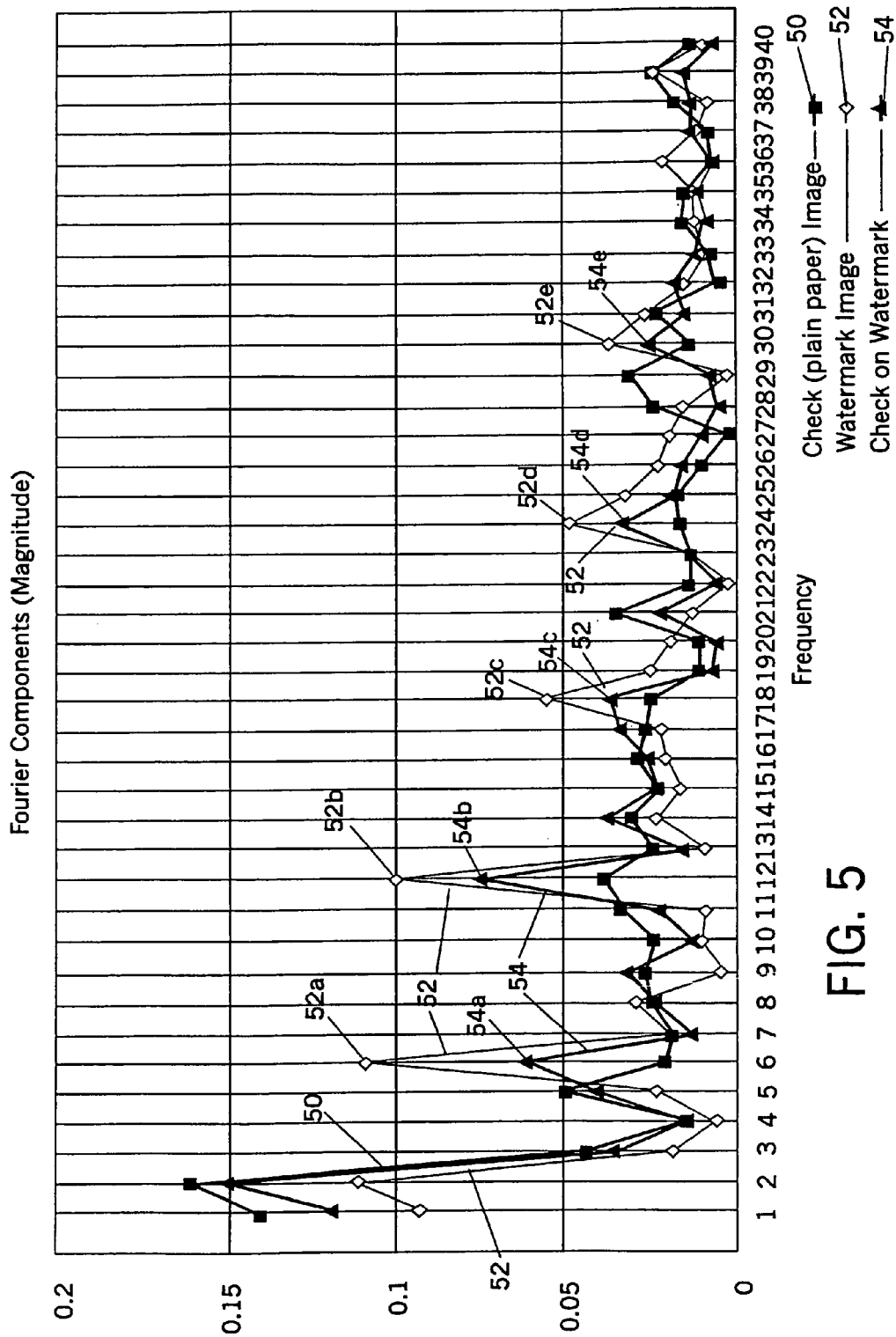

FIG. 3 is a view of a document with background information;

FIG. 4 is a view of a document including a watermark and background information;

FIG. 5 is a plot of the frequency distribution of the document of FIG. 4.

Figure 6:
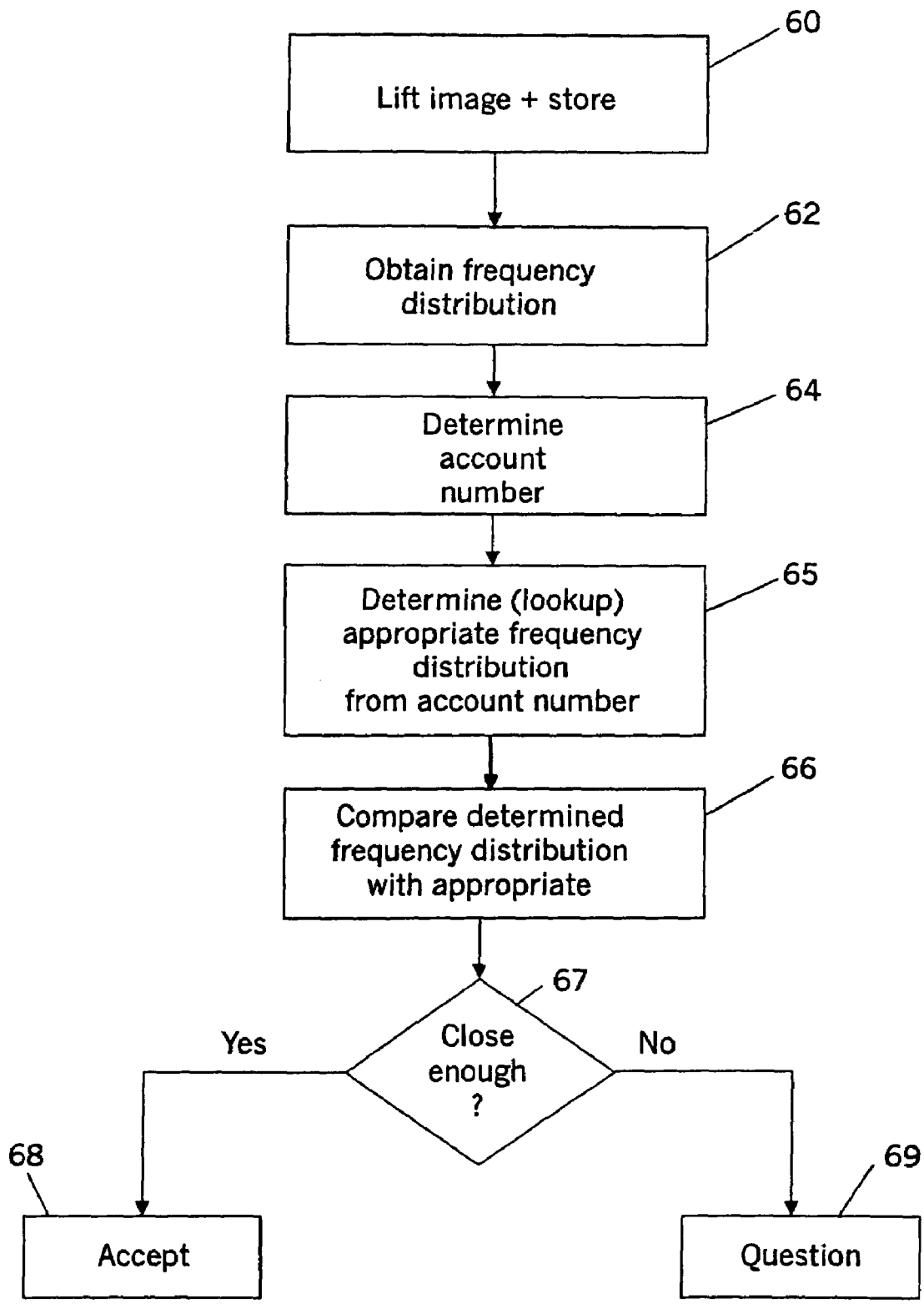

FIG. 6 is a flow chart of the process of the present invention.

DETAILED DESCRIPTION OF THE PREFERRED EMBODIMENT

In the following description of the preferred embodiment, the best implementation of practicing the invention presently known to the inventor will be described with some particularity. However, this description is intended as a broad, general teaching of the concepts of the present invention using several specific embodiments but is not intended to be limiting the present invention to that as shown in these embodiments, especially since those skilled in the relevant art will recognize many variations and changes to the specific structure and operation shown and described with respect to these figures.

FIG. 1 illustrates a document processing system 10 of the type useful in processing documents including a watermark as described in connection with the present invention. The document processing system 10 in the preferred embodiment includes a system for moving documents from an input hopper 12 to one of several output pockets or bins 14, moving each document in sequence past internal components within the document processing system (not shown) which perform some combination of the following steps: read a portion of the document; lift and store an image of the document, perhaps both front and read, in either black and white or gray scale; analyze the portion of the read portion of the document according to a stored program to determine into which output bin to sort the document, print information on the document and microfilm the document.

In the case where the document is a check being processed by a system such as the IBM 3890 Document Processor with the ImagePlus High Performance Transaction System, the check includes a set of characters printed in magnetic ink character recognition (MICR) font on the front of the check and the system includes a MICR reader (typically using magnetic reading techniques common in the art to determine the printed numbers). Those printed numbers include the routing and transit codes, the account number and the amount as well as optionally a check number. The IBM system described about also lifts an image of the front and back of the document in each of black and white and gray scale for use in later processing of the image using an image scanned module 16 and an image capture processor 18. The IBM system also includes a stored program which specifies into which of a plurality of pockets each document is to be sorted based on the MICR characters, allowing a bank to use conventional technology to put checks on that bank in one pocket, to put checks on other local bank(s) in other pocket(s) and checks going to distant banks in pocket(s) designated for sending to a collecting bank such as the Federal Reserve Bank, although the sorting and the designation of pockets is somewhat arbitrary and the document processing system could be used to advantage for other sorting functions such as taking checks on a single account and placing them in numeric sequence order.

FIG. 2 illustrates an image of a document 20 with the appearance of a watermark 22 formed thereon. While it is possible to prepare the check on paper which has a watermark (where the watermark is physically a part of the paper and created during the manufacturing process for the check in a well-known fashion), it is also contemplated by the present invention that an image of a watermark could be applied to a document during the imaging process, that is, added electronically to the captured image obtained by passing the check through the document processing system 10 of FIG. 1 as described in the Check Image Patent referenced above.

FIG. 3 is an image of a second document 30 (a different check) in which the document includes a printed background 32 in addition to the elements which are conventionally printed on the document including a MICR line 34 and other components of a check such as printed lines for the date, payee, amount fields and signature line. While the printed lines for the payee, amount fields and signature line as well as the MICR line tend to occupy a rather small portion of the document with a rather sharp black image, the printed backgrounds for documents such as checks tend to be more diverse, sometimes occupying much, if not all, of a side of the document and including various shades of color or gray. In short, documents with background present a diverse image with many pixels of shades of color, making imaging of the document difficult and have the potential for interfering with imaging equipment.

FIG. 4 shows an image 40 of a document with both a watermark 42 and a printed background of the type which is sometimes found on checks with scenic backgrounds.

Images from the check imaging process using an apparatus such as is shown in FIG. 1 can be processed to create a frequency distribution from the image. While the entire document could be analyzed, this would require the processing of a large amount of information and require significant processing power or time. Instead of processing the entire image, a long, narrow rectangular region of the document is selected for processing as representative of the entire document. If the check has been prepared with the watermark occurring in a particular portion of the document, then obviously that portion of the document is used. However, many documents are prepared with repeating watermarks and a long, narrow rectangle is sufficient to capture a relevant portion of the watermark. For example, in one embodiment, one can sample data in a rectangular section of the document which is transverse to the direction in which the document was scanned. In this embodiment, the watermark is expected to be present in the rectangle in the direction transverse of the scan. The image of the selected portion is then summed in the direction of the watermark (e.g., transverse to the direction in which the document was scanned) and Fourier analysis is performed in a known fashion on the image of the selected area. The magnitude of the frequency components are normalized and plotted (or otherwise analyzed, as with a digital computer using a stored program) as a function of the frequency to determine relative peaks in magnitude.

FIG. 5 is a view of three different frequency distributions from Fourier analysis on documents. As illustrated in this view, a first plot 50 (using square data points) illustrates a representative plot for a plain paper check image (without a watermark). A second plot 52 (using diamond data points) illustrates a representative plot for a watermark image. A third plot 54 (using triangular data points) illustrates a representative plot for the analysis of a check with a watermark. Each of the plots includes a plurality of relative maximums or peaks, and the location of these peaks determines whether there is a "beat" or harmonic pattern and at what frequency. The second plot 52 includes relative peaks at a frequency of 6 (data point 52a), 12 (data point 52b), 18 (data point 52c), 24 (data point 52d) and 30 (data point 52e). Similarly, the plot of the check plus watermark has relative peaks 54a, 54b, 54c, 54d and 54e at the corresponding frequency location. The first plot 50 of the plain check does not have such a pattern, with relative peaks occurring at almost random locations (for example, at frequency 5, 12, 21, 29 as shown in FIG. 5). While the second plot 52 and third plot 54 have a frequency distribution 50 includes a "beat" pattern which is the result of including the watermark, a beat pattern is not present in the first plot 50, the frequency distribution of the image without the watermark. Different watermarks have different frequency distributions and a harmonic or beat pattern at different frequencies. So, while the plots shown in FIG. 5 have a beat pattern at a frequency interval of 6, other watermarks may have a beat pattern at a lesser or greater frequency, but the beat pattern in the image of the check plus a watermark matches the beat pattern in the original watermark. Knowing the watermark of a particular watermark (and storing it in a table associated with the particular check, as indicated by its account number) then allows for images of checks which are supposed to bear that watermark to be validated. The validity of the image can therefore be verified by determining that the frequency of the beat pattern is the one which is expected as described in connection with the Watermark Detection Patent referenced above.

FIG. 6 is a flow chart of one method of practicing the present invention. The first step in the method is to obtain (lift) and store an image of the document using conventional equipment at block 60. Then, characteristics (such as one or more beat frequency) of the image are determined at block 62, with a watermark, if present, providing certain characteristics including a repeating sequence providing one or more beat frequency despite the content of the document. Since the document includes identifying information which is read as the document is processed in the document processor as is described in the Check Image Patent, the account number for the document is available to the system. At block 64, that identifying information for the check such as the account number is located and used at block 65 to determine (e.g., from a lookup table, not shown) what characteristic frequency the watermark should impart to the image. At block 66, the characteristics of the image are compared with the stored characteristics to determine whether the image has the correct watermark. If the check is determined to have the correct pattern at block 67 (which may include a function of being close enough, depending on the tolerance of the system and any changes which might occur to a check during handling), then at block 68 the check is accepted as appropriate. If the check does not, then the check is considered suspect and identified for further consideration and special handling at block 69, because the check may be a forgery.

The present invention may be implemented in the a computer such as a general purpose processor with suitable software. It may also be implemented through the use of a specialized processor which is configured to do the processing described in connection with the previous description. The present invention can be realized, according to the designer's interests, in hardware, software, or a combination of hardware and software. An image processing system according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. Relevant portions of the present invention can also be embedded in one or more computer program products, which comprise at least selected portions of the features enabling the implementation of the methods described herein, and which—when loaded in a computer system—are able to carry out these methods.

As used in the present document, software, computer program and computer program means are used interchangeably. Software in the present context means any expression, in any language, code or notation, of a set of instructions intended to cause a system having an information processing capability to perform a particular function either directly or after either or both of the following a) conversion to another language, code or notation; b) reproduction in a different material form.

Of course, many modifications of the present invention will be apparent to those skilled in the relevant art in view of the foregoing description of the preferred embodiment, taken together with the accompanying drawings and the appended claims. For example, different methods of analyzing the image can be used other than Fourier analysis and transforms can be used to advantage in detecting an image pattern and a characteristic frequency. Additionally, some elements of the present invention can be used to advantage without the corresponding use of other elements. For example, the use of an artificial watermark, or one which was created digitally as described in the Watermarking Patent, could be used in place of a watermark which is placed in the paper. Accordingly, the foregoing description of the preferred embodiment should be considered as merely illustrative of the principles of the present invention and not in limitation thereof.

The invention claimed is:

1. A method for detecting a watermark in an image of a document including data, the steps of the method comprising:
   measuring the distribution of the data on the document;
   determining a characteristic frequency of the distribution of the data on the document, wherein the determining of a characteristic frequency comprises ascertaining whether the distribution of data contains a plurality of relative peaks each located at a frequency interval indicative of a beat pattern, wherein the ascertained beat pattern represents the characteristic frequency of the data on the document; and
   comparing the characteristic frequency of the data on the document with a frequency which is associated with the document to determine if the document is authentic, wherein the comparing comprises comparing the beat pattern associated with the data on the document with a predetermined beat pattern associated with the document.

2. A method of detecting a watermark in an image of a document including the steps of claim 1 wherein the step of determining a characteristic frequency includes the step of performing a Fourier analysis on the data.

3. A method of detecting a watermark in an image of a document including the steps of claim 1 wherein the step of determining a characteristic frequency includes the step of sampling the data in a rectangular section of the document which is transverse to the direction in which the document was scanned.

4. A method of detecting a watermark in an image of a document including the steps of claim 1 wherein the method further includes reading indicia from the document and determining the correct characteristics for the watermark and comparing the characteristics of the detected watermark to determine that the correct watermark has been identified for the document.

5. A method of detecting a watermark in an image of a document including the steps of claim 4 wherein the step of determining the correct characteristics includes the step of using a lookup table in which the characteristic frequency is stored in the table by account number.

6. A method of detecting a watermark in an image of a document including the steps of claim 3 wherein any watermark on the document is expected to be present in a direction transverse of the scan and in the rectangle extending in the direction of the watermark.

7. A method of determining the authenticity of a document comprising the steps of:
   generating an image of the document;
   determining at least one characteristic frequency associated with the image of the document, wherein the determining of at least one characteristic frequency comprises obtain mci a frequency distribution of data from the image of the document and ascertaining whether the distribution of data contains a plurality of relative peaks each located at a frequency interval indicative of a beat pattern, wherein the ascertained beat pattern represents the characteristic frequency of the data on the document; and determining if the at least one characteristic frequency associated with the image of the document as determined matches at least one characteristic frequency for the document if it were authentic, wherein the determining comprises comparing the beat pattern associated with the data on the document with a predetermined beat pattern associated with the document if it were authentic.

8. A method of determining the authenticity of a document comprising the steps of claim 7 and further includes the steps of determining an account number for the document, using the determined account number to ascertain an appropriate frequency for the document and comparing that frequency with the observed frequency.

9. A method of determining the authenticity of a document including the steps of claim 8 wherein the step of ascertaining the appropriate frequency includes the step of looking up the account in a stored lookup table.

10. A method of determining the authenticity of a document comprising the steps of claim 7 and further including the step of determining whether the frequency is close enough to accept the document as authentic.

11. A system of detecting a watermark in a document and comparing the detected watermark to determine the authenticity of the watermark, the system comprising:

an image camera which generates an image of the document;

an image storage which retains the image of the document;

an analysis unit coupled to the image storage which determines a characteristic frequency of the image, wherein the analysis unit obtains a frequency distribution of data from the generated image of the document and ascertains whether the distribution of data contains a plurality of relative peaks each located at a frequency interval indicative of a beat pattern; and a comparison unit which compares the characteristic frequency determined by the analysis unit with the correct characteristic for the document, wherein the comparison unit compares the beat pattern associated with the data on the generated image of the document with a predetermined beat pattern associated with the retained image document; and a rejection unit which identifies documents for which the characteristic frequency is not appropriate for the correct characteristics of the document, whereby the documents which have been identified by the rejection unit may be examined in another way.

12. A system including the elements of claim 11 and further including a stored table including the correct characteristics for a document.

13. A system including the elements of claim 11 wherein the system further includes an apparatus which determines an account number for the document and the correct characteristics for the document are based on the account number.

14. A system including the elements of claim 11 wherein the system further includes an apparatus which determines whether the characteristics of the document are close enough to the appropriate characteristics of the document to allow acceptance of the document.

15. A system including the elements of claim 14 wherein the system further includes a reject pocket and documents which do not have the appropriate characteristics are put in the reject pocket as a result of processing the document.

* * * * *